United States Patent [19]
Nakamura et al.

[11] 4,261,751
[45] Apr. 14, 1981

[54] OPTICAL GLASSES

[75] Inventors: Hiroshi Nakamura, Yokohama; Takeo Ichimura, Tokyo, both of Japan

[73] Assignee: Nippon Kogaku K. K., Tokyo, Japan

[21] Appl. No.: 13,290

[22] Filed: Feb. 21, 1979

[30] Foreign Application Priority Data

Feb. 24, 1978 [JP] Japan .................... 53-19625

[51] Int. Cl.³ .................. C03C 3/16; C03C 3/12; C03C 3/30
[52] U.S. Cl. .................. 156/47 Q; 156/52; 156/53
[58] Field of Search .............. 156/47 Q, 52, 53

[56] References Cited

U.S. PATENT DOCUMENTS

| | | | |
|---|---|---|---|
| 3,877,953 | 4/1975 | Broemer et al. | 156/47 Q |
| 3,979,322 | 9/1976 | Alexesv et al. | 156/47 Q |
| 4,076,647 | 2/1978 | Faulstick et al. | 156/47 Q |
| 4,108,673 | 8/1978 | Toratani et al. | 156/47 Q |
| 4,115,131 | 9/1978 | Ishibashi et al. | 156/47 Q |

Primary Examiner—O. R. Vertiz
Assistant Examiner—Mark Bell
Attorney, Agent, or Firm—Shapiro and Shapiro

[57] ABSTRACT

An optical glass having a high dispersion and a refractive index in the range of from 1.53 to 1.86 and an Abbe number in the range of from 21 to 43 comprises substantially the following components in percent by weight:

$P_2O_5$: 10-72
$R^I_2O$: 0-41
$ZnO$: 0-46

(provided that $R^I_2O + ZnO$: 5-50)
$Nb_2O_5$: 22-63 wherein $R^I_2O$ is $Li_2O$, $Na_2O$ or $K_2O$ or combination of two or more thereof.

4 Claims, 2 Drawing Figures

OPTICAL GLASSES

BACKGROUND OF THE INVENTION

1. Field of the Invention

The present invention relates to an improvement over optical glasses having high dispersions.

2. Description of the Prior Art

There are known and used various optical glasses having high dispersions. Among them, those optical glasses are of importance which are generally called flint glass, dense flint glass, dense barium flint glass etc. and which comprise silicic anhydride or boric anhydride as network forming oxide, alkali metal or alkaline earth metal oxide, zinc oxide, lead oxide, titanium oxide and the like as network modifying oxide or aluminium oxide as intermediate oxide. This class of optical glasses is widely used as an indispensable material for the preparation of optical system components. However, their physical properties are not always satisfactory, in particular, with respect to light transmittivity. This deficiency is found especially in those optical glasses which are high in refractive index and low in the contents of sillicic anhydride. With the increasing popularity of color photography, the yellowing of glass which is often observed in optical glasses has become a much more important problem than before. Furthermore, the polish processing technique of optical glass has noticeably progressed recently, which in turn subjects the optical glass to a severer processing condition. Also, the increasing use of reflection reducing optical coating film requires the optical glass to have a surface of excellent stability against corrosion and deterioration. For these reasons, the chemical durability of optical glasses has become much more important than before.

SUMMARY OF THE INVENTION

Accordingly, it is an object of the present invention to provide high dispersion optical glasses which minimize the problem of getting colored and have an excellent chemical durability.

To attain the above and other objects according to the present invention, there is provided an optical glass the essential system of which is $P_2O_5$-$R^I_2O$-$ZnO$-$Nb_2O_5$ wherein $R^I_2O$ is $Li_2O$, $Na_2O$ or $K_2O$ or any combination of two or more thereof and the optical constants of which are 1.53–1.86 in refractive index $n_d$ and 21–43 in Abbe number $v_d$.

DETAILED DESCRIPTION OF THE PREFERRED EMBODIMENTS

Figure 1:
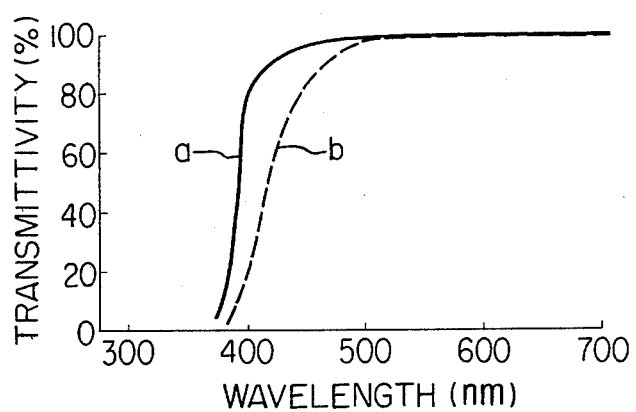
FIGS. 1 and 2 graphically illustrate the spectral transmittivity of optical glasses according to the present invention and of optical glasses according to the prior art.

The first composition of the optical glass according to the invention is as follows (all the values are in precent by weight):

$P_2O_5$: 10–72
$R^I_2O$: 0–41
$ZnO$: 0–46
(provided that $R^I_2O + ZnO$: 5–50)
$Nb_2O_5$: 22–63 wherein and also hereinafter $R^I_2O$ has the same meaning as defined above.

The optical glass may comprise the following additional ingredients:

$TiO_2$: 0–26
$Al_2O_3$: 0–14
$R^{II}O$: 0–47
$PbO$: 0–32
$GeO_2$: 0–55
$Ta_2O_5$: 0–22
$WO_3$: 0–47
$F$: 0–16
$SiO_2$: 0–4
$Y_2O_3$: 0–6
$ZrO_2$: 0–5
$La_2O_3$: 0–4 wherein, $R^{II}O$ is $MgO$, $CaO$, $SrO$ or $BaO$ or any combination of two or more thereof.

Generally speaking, $P_2O_5$ which forms a phosphate system glass is characterized in that it, as a network forming oxide, allows to melt and form a glass at a lower temperature as compared with $SiO_2$ for forming silicate system glass or $B_2O_3$ for borate system glass and that it gives a glass having a higher transmittivity over the range of from visible to near ultraviolet light.

On the other hand, the alkali metal oxide $R^I_2O$ and $ZnO$ have an effect to broaden the vitrification range for phosphate glass. Moreover, they lower the liquid phase temperature of glass mass and therefore the use of these components make it possible to minimize the problem that glass gets colored due to corrosion of the pot during the time of melting.

$Nb_2O_5$ imparts to the glass favourable properties of high refractive index and relatively high dispersion. Also, it improves the chemical durability of glass. However, hitherto, this oxide, $Nb_2O_5$ was allowed to be contained in glass only in a small content.

Therefore, in the prior art the use of $Nb_2O_5$ has been limited to a very narrow range.

According to the present invention, the allowable range of the contents of $Nb_2O_5$ can be widened and also the vitrification range in which the glass is stable against devitrification can be broadened by using $R^I_2O$ and $ZnO$ together with $P_2O_5$ in an appropriate ratio.

The contents of each of the components must be within the range given above. The upper and lower limits have been determined according to the invention for the following reasons:

$P_2O_5$ which is a network forming oxide must be used in the range of 10–72%. In order to make a full use of the above described particular properties of this network forming oxide, the latter must be present in an amount of at least 10%. However, when it is used in an amount more than 72%, a sufficiently high refractive index is no longer attainable and also the chemical durability of glass is reduced.

$R^I_2O$ and $ZnO$ must be present in an amount of at least 5% as the sum of the two ingredients to produce the aimed effect. However, with the increase of contents of these oxides, devitrification of glass becomes gradually noticeable and its chemical durability is reduced accordingly. Therefore, the upper limit of the contents is 41% for $R^I_2O$ and 46% for $ZnO$, and the sum of the both can not exceed 50%. The best result is obtained by using $K_2O$ as the $R^I_2O$.

In order to obtain the desired optical constants as well as an adequate chemical durability, the contents of $Nb_2O_5$ must be at least 22%. The use of it over 63% will make the glass unstable against devitrification.

By using only the system of $P_2O_5$-$R^IO$-ZnO-$Nb_2O_5$ in this manner there is obtainable a stable optical glass. But, in order to further broaden the range of optical constants it is sometimes necessary to add some other components to the system. The addition of other components in a suitable amount will allow not only to adjust the optical constants as desired but also to use a lower temperature for making the glass because the melting point of mixture is lowered by such addition. This brings forth in turn such advantage that melting of glass mixture can be carried out more easily and the trouble of glass being contaminated and colored by possible corrosion of the pot can be eliminated to the utmost extent.

$TiO_2$ has an effect similar to that of $Nb_2O_5$ and can give the glass a high refractive index and a relatively low Abbe number. Therefore, the addition of $TiO_2$ makes it possible to obtain the desired optical constants even when the contents of $Nb_2O_5$ are reduced. Moreover, it works to lower the liquid phase temperature of glass and makes it easy to produce glasses of high refractive index and stability against devitrification. The glass containing $TiO_2$ is very excellent in chemical durability. The light transmittivity of glass may be seldom reduced by addition of $TiO_2$. Under a certain particular condition of melting, the use of $TiO_2$ in a very large contents may cause some coloration of the glass in purple. Such coloration of the glass may be avoided by adding to the mass to be melted a suitable amount of arsenious acid $As_2O_3$. In this case, an oxidizing atmosphere is preferably used. The use of $TiO_2$ over 26% increases devitrifiability and raised up the melting temperature. Therefore, the upper limit of content of $TiO_2$ is 26%.

Addition of $Al_2O_3$ has an effect for stabilizing structure of glass and repressing devitrification. Therefore, the addition of $Al_2O_3$ is useful for making optical glasses stable over a broader range of optical constants. But, addition of more than 14% works adversely to increase devitrifiability.

Addition of alkaline earth metal oxide $R^{II}O$ broadens the vitrification range and lowers the melting temperature of glass mass. Therefore, it has an effect to prevent the glass from getting contaminated and colored by corrosion of the pot and to increase the stability of glass against devitrification. However, the use of $R^{II}O$ which may be a single compound or combination of two or more compounds defined above over 47% in total causes an increase of devitrifiability of glass. The effect of reducing the trouble of contaminative coloring caused by corrosion of the pot and of broadening the vitrification range in which the glass is stable against devitrification becomes most remarkable when BaO is used as $R^{II}O$.

The addition of PbO in a suitable amount has an effect to give a small Abbe number relative to refractive index to the glass and also to widen the vitrification range and lower the liquid phase temperature of glass. But, when it is added in an amount more than 32%, the glass gets colored intensely.

Addition of $GeO_2$ has a remarkable effect to stabilize the glass against devitrification because $GeO_2$ itself is a network forming oxide. By substituting $GeO_2$ for a part of $P_2O_5$ there is obtained a glass which has a large refractive index and relatively high dispersion at the same time. Since the raising of liquid phase temperature and coloring of glass become more and more noticeable with the increase of content of $GeO_2$, it must be used in an amount less than 55%.

$Ta_2O_5$ can be added as an ingredient which gives the glass a high refractive index and a low Abbe number. It may be used in place of a portion of $Nb_2O_5$. The use of $Ta_2O_5$ in an amount more than 22% will increase the tendency of devitrification of glass.

$WO_3$ serves to give the glass a high refractive index to the same extent as that of $Nb_2O_5$. Therefore, even when the contents of $Nb_2O_5$ are decreased, a high refractive index glass can be obtained by adding $WO_3$. Other effects obtainable by adding $WO_3$ are to lower the liquid phase temperature of glass mass and to allow an easy manufacture of glasses of high refractive index which are stable against devitrification. Use of $WO_3$ in a content over 47% will cause the glass to be colored deeply.

Sometimes, fluorine F may be added to lower the liquid phase temperature and increase the light transmittivity with a good result. Addition of F has furthermore an effect to produce a glass of small Abbe number. When F is added in high content, a violent evaporation of fluorine and fluorine compounds occurs in the glass mass during melting which finally results in changing the optical properties of produced glass and in formation of striae in the glass. Therefore, F is preferably used in an amount less than 16%.

Addition of $SiO_2$ increases the viscosity of glass and therefore it is effective for reducing the devitrifiability of glass. However, use of it in a content over 4% often has the disadvantage that some unmelted matter is produced in the molten glass mass. This makes it difficult to manufacture a homogeneous glass.

$Y_2O_3$, $ZrO_2$ and $La_2O_3$ can be added only in a very small amount to further improve the optical properties of glass. All these compounds work in the direction of raising the liquid phase temperature and increasing the devitrifiability of glass. Therefore, these compounds must be added in a suitable content only when addition of such compounds is absolutely necessary to improve the optical properties of the glass then produced. Allowable contents of these components, if added, are less than 6% for $Y_2O_3$, less than 5% for $ZrO_2$ and less than 4% for $La_2O_3$.

For the first composition given above, therefore, it is recommended that the following second composition be employed, which can produce an optical glass stable against devitrification together with the merits of low liquid phase temperature and reduced possibility of contaminative coloring of glass caused by pot:

$Y_2O_3$: 0
$ZrO_2$: 0
$La_2O_3$: 0

Among the ranges of the above second composition, the following third composition (all the values are in percent by weight) is preferable since it can give the glass a more improved chemical durability:

$P_2O_5$: 10–52
$R^I_2O$: 0–34
ZnO: 0–35
(wherein, $R^I_2O$+ZnO: 5–40).

In the ranges of the above third composition, the following fourth composition (% by weight) is more preferably used in manufacturing a high power lens, since higher refractive index ($n_d$: 1.65–1.86) and higher dispersion ($\nu_d$: 21–34) can be obtained thereby:

$P_2O_5$: 10–42
$R^I_2O$: 0–32

In the ranges of the above fourth composition, the following fifth composition enables the production of optical glasses having a better light transmittivity:

$P_2O_5$: 18–42
$R^I_2O$: 0–32
ZnO: 0–35
(wherein, $R^I_2O + ZnO$: 12–40)
$Nb_2O_5$: 24–45
$TiO_2$: 1–22
PbO: 0–30
$GeO_2$: 0–40
$WO_3$: 0–35

Within the ranges of the above fifth composition, the following sixth composition (% by weight) gives optical glasses of especially high stability against devitrification:

$P_2O_5$: 24–38
$R^I_2O$: 10–26
ZnO: 0–15
(wherein, $R^I_2O + ZnO$: 12–27)
$Nb_2O_5$: 24–40
$TiO_2$: 1–19
$Al_2O_3$: 1–12
$R^{II}O$: 0–15
PbO: 0–20
$GeO_2$: 0–20
$Ta_2O_5$: 0–10
$WO_3$: 0–20
F: 0–6
$SiO_2$: 0–3

Optical glasses according to the invention can be prepared employing a suitable manufacturing process known per se. $P_2O_5$ is added to the mixture of components in formulation using an aqueous solution of orthophosphoric $H_3PO_4$ or other phosphate such as potassium metaphosphate as raw material. As for other ingredients, oxide, carbonate, nitrate and fluoride corresponding to the necessary components can be used as raw material respectively. In formulation, a defoamer or anti-foaming agent such as arsenious acid may be added if desired. These raw materials are weighted to give the desired ratio of glass components, mixed together to form a batch of mixture and introduced into a platinum pot placed in an electric furnace being heated up to 1100°–1200° C. After melting and clarification, the molten mass is stirred and homogenized. The homogenized molten glass mass is cast into a die made of iron and annealed. Fluorine, if used, may be added in a form of fluoride of the component cation.

Composition (% by weight), refractive index $n_d$ and Abbe number $\nu_d$ of various examples of the present invention are shown in Table I as Examples 1 to 14. In Examples 10 to 14, cations contained in the glasses are calculated as the corresponding oxides the values of which are given in Table I in percent by weight. In these examples, a portion of oxygen ions is replaced by fluorine ions.

TABLE I

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $P_2O_5$ | 31.0 | 28.4 | 31.3 | 30.0 | 30.0 | 31.3 | 30.0 | 30.0 | 30.0 | 34.1 | 30.9 | 20.6 | 28.6 | 31.5 |
| $Li_2O$ | — | — | — | — | — | — | — | — | — | 1.6 | — | — | — | — |
| $Na_2O$ | 11.0 | — | — | — | — | — | 10.0 | — | 10.0 | 4.5 | — | — | 5.7 | 7.1 |
| $K_2O$ | 10.0 | 32.3 | 16.2 | 28.9 | 26.7 | 32.0 | 15.0 | 27.2 | 18.0 | 6.6 | 28.8 | 21.6 | 7.9 | 9.0 |
| ZnO | — | — | 4.8 | — | — | — | 7.0 | — | 7.0 | 1.5 | — | — | — | — |
| $Nb_2O_3$ | 25.0 | | | | | | | | | | | | | |
| $Nb_2O_5$ | | 22.5 | 22.9 | 22.4 | 23.3 | 23.2 | 23.0 | 23.4 | 23.0 | 33.6 | 23.9 | 22.0 | 38.6 | 36.2 |
| $TiO_2$ | 8.0 | 2.3 | 24.8 | 1.4 | 1.2 | 5.3 | 10.0 | 2.3 | 10.0 | 13.9 | 9.6 | 18.3 | 2.8 | 1.6 |
| $Al_2O_3$ | 5.0 | 12.5 | — | 2.0 | 1.5 | 3.0 | — | — | — | 2.7 | 2.0 | 2.8 | 2.1 | 2.4 |
| MgO | | — | — | | | | | | | | | | | |
| CaO | | — | — | 2.5 | 2.3 | — | — | — | | | | | | |
| SrO | | 2.0 | — | 2.8 | — | — | — | | | | | | | |
| BaO | | — | — | | | | | | | — | — | — | 4.5 | 3.1 |
| PbO | | — | — | — | — | 2.0 | — | 13.3 | — | — | — | — | 7.2 | 6.2 |
| $GeO_2$ | | — | — | — | — | | — | — | | | | | | |
| $Ta_2O_5$ | | | | 10.0 | — | — | — | — | | | | | | |
| $WO_3$ | | | | — | 15.0 | — | — | — | | | | | | |
| $SiO_2$ | | | | — | — | 2.8 | — | — | | | | | | |
| $Y_2O_3$ | | | | — | — | — | 5.0 | — | | | | | | |
| $ZrO_2$ | | | | — | — | — | — | 3.8 | | | | | | |
| $La_2O_3$ | | | | | | | | | 2.0 | — | — | — | — | — |
| F | | | | | | | | | — | 1.5 | 4.7 | 14.6 | 2.4 | 2.7 |
| $As_2O_3$ | | | | | | | | | | — | — | — | 0.2 | 0.2 |
| $n_d$ | 1.6863 | 1.5879 | 1.8178 | 1.6339 | 1.6439 | 1.6214 | 1.7024 | 1.6698 | 1.6897 | 1.7993 | 1.6306 | 1.6150 | 1.7618 | 1.6990 |
| $\nu_d$ | 28.7 | 40.2 | 21.8 | 35.6 | 33.7 | 34.1 | 28.5 | 31.4 | 29.1 | 21.9 | 27.0 | 27.7 | 26.5 | 30.0 |

The glass of the above Example 13 and a conventional glass having the same refractive index $n_d$ and Abbe number $\nu_d$ were compared with respect to light transmittivity. FIG. 1 shows the result wherein the curve (a) of solid line is spectral transmittivity curve obtained from the optical glass of the present invention and the broken line curve (b) is that for the conventional one.

Figure 2:
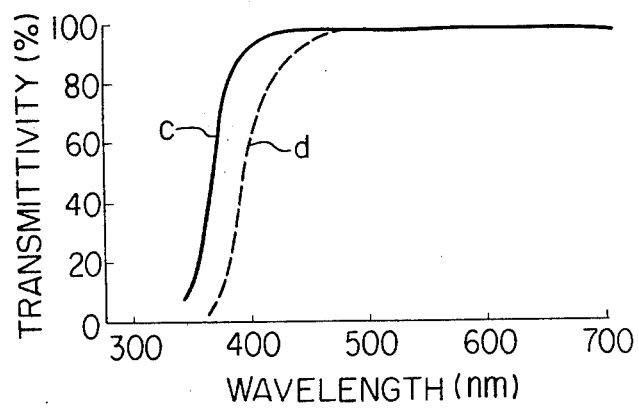

Similarly, the glass of Example 14 and a conventional glass having the same refractive index and Abbe number are compared. FIG. 2 shows the result wherein the solid line curve (c) is the spectral transmittivity curve of the glass according to the invention and the broken line curve (d) is that for the conventional one. Transmittivity was measured at 10 mm inside of the glass. From FIGS. 1 and 2 it is evident that the glasses of the present invention are superior to the corresponding glasses of the prior art in respect of transmittivity of short wavelength range of light.

The glasses of Examples 13 and 14 and the corresponding prior art ones having the same refractive index and Abbe number were also compared in respect to resistance to acids which gives a measure of chemical durability of glass. Tests were conducted in the following procedure:

Sample of glass particles of 420–590 μm in size of specific weight gram was placed in 0.01 N solution of nitric acid at 100° C. After maintaining it in the acid solution for an hour (60 minutes), the loss of weight in the sample was measured and its weight loss rate (percent by weight) was calculated from the original weight and the found loss in weight of the sample. The smaller the weight loss rate is, the better chemical durability the glass has. Table II shows the results of this comparative test. From the data shown in Table II it is evident that the optical glasses according to the present invention are superior to the corresponding prior art glasses also in chemical durability.

TABLE II

Chemical Durability Test

|  | Resistance to acids |
|---|---|
| Example 13 glass | 0.04% |
| Prior art glass | 0.073% |
| Example 14 glass | 0.05% |
| Prior art glass | 0.093% |

The present invention enables to make high dispersion optical glasses excellent in light transmittivity as well as chemical durability in industrial scale and in a stable manner.

We claim:

1. An optical glass composition having a high dispersion and a refractive index in the range of from 1.53 to 1.86 and Abbe number in the range of from 21 to 43, said glass composition consisting essentially of, in percent by weight, the components of:

$P_2O_5$: 10–52
$R^I_2O$: 0–34
ZnO: 0–35
(wherein, $R^I_2O + ZnO$: 5–40)
$Nb_2O_5$: 24–63
$TiO_5$: 1–26
$Al_2O_3$: 0–14
$R^{II}O$: 0–40
PbO: 0–32
$GeO_2$: 0–55
$Ta_2O_5$: 0–22
$WO_3$: 0–47
F: 0–16
$SiO_2$: 0–4
$Y_2O_3$: 0–6
$ZrO_2$: 0–5
$La_2O_3$: 0–4 wherein, $R^I_2O$ is $Li_2O$, $Na_2O$ or $K_2O$ or combination of two or more thereof, and
wherein $R^{II}O$ is MgO, CaO, SrO, or BaO or combination of two or more thereof.

2. An optical glass composition having a high dispersion as claimed in claim 1, wherein said glass composition comprises, in percent by weight:

$P_2O_5$: 10–42
$R^I_2O$: 0–32
$R^{II}O$: 0–32.

3. An optical glass composition having a high dispersion as claimed in claim 2, wherein said glass composition comprises, in percent by weight:

$P_2O_5$: 18–42
$R^I_2O$: 0–32
ZnO: 0–35
(wherein, $R^I_2O + ZnO$: 12–40)
$Nb_2O_5$: 24–45
$TiO_2$: 1–22
$GeO_2$: 0–40
$WO_3$: 0–35.

4. An optical glass composition having a high dispersion as claimed in claim 3, wherein said glass composition comprises, in percent by weight, the components of:

$P_2O_5$: 24–38
$R^I_2O$: 10–26
ZnO: 0–15
(wherein, $R^I_2O + ZnO$: 12–27)
$Nb_2O_5$: 24–40
$TiO_2$: 1–19
$Al_2O_3$: 1–12
$R^{II}O$: 0–15
PbO: 0–20
$GeO_2$: 0–20
$Ta_2O_5$: 0–10
$WO_3$: 0–20
F: 0–6
$SiO_2$: 0–3.

* * * * *